United States Patent
Schreiber et al.

(10) Patent No.: US 8,830,477 B2
(45) Date of Patent: Sep. 9, 2014

(54) METHOD FOR DETERMINING LOADS ON A MECHANICAL STRUCTURE AND THE RESULTANT DAMAGE

(75) Inventors: Ulrich Schreiber, Miltach (DE); Andreas Rasch, Bahlingen (DE); John B. Mander, College Station, TX (US); Athol James Carr, Christchurch (NL)

(73) Assignee: Northrop Grumman LITEF GmbH, Freiburg (DE)

( * ) Notice: Subject to any disclaimer, the term of this patent is extended or adjusted under 35 U.S.C. 154(b) by 1526 days.

(21) Appl. No.: 12/223,802

(22) PCT Filed: Jan. 31, 2007

(86) PCT No.: PCT/EP2007/000833
§ 371 (c)(1),
(2), (4) Date: May 24, 2010

(87) PCT Pub. No.: WO2007/088042
PCT Pub. Date: Aug. 9, 2007

(65) Prior Publication Data
US 2010/0231919 A1    Sep. 16, 2010

(30) Foreign Application Priority Data

Feb. 2, 2006 (DE) .......... 10 2006 005 258

(51) Int. Cl.
*G01C 19/72* (2006.01)
*G01M 5/00* (2006.01)

(52) U.S. Cl.
CPC .......... *G01M 5/0091* (2013.01); *G01M 5/0033* (2013.01)
USPC .............................................. 356/460

(58) Field of Classification Search
CPC ..... G01M 5/00; G01M 5/008; G01M 5/0033; G01M 5/0025; G01M 5/0041; G01M 5/005; G01M 5/0091; G01B 11/16; G01B 11/161
USPC .......... 356/450–521; 73/503–504.04
See application file for complete search history.

(56) References Cited

U.S. PATENT DOCUMENTS 4,594,790 A * 6/1986 Engebretson .................. 33/304
4,712,306 A * 12/1987 Cahill et al. .................... 33/304

(Continued)

FOREIGN PATENT DOCUMENTS

EP      0 005 372    11/1979
EP      0409 341     1/1991

(Continued)

OTHER PUBLICATIONS

Inaudi et al., "Interferometric Inclinometer for Structural Monitoring", 15th Optical Fiber Sensor Conference Technical Digest, v. 1 (2002), IEEE Piscataway, NJ, pp. 381-394.

*Primary Examiner* — Tarifur Chowdhury
*Assistant Examiner* — Michael P Lapage
(74) *Attorney, Agent, or Firm* — Elliott N. Kramsky

(57) ABSTRACT

A method for determination of loads in a mechanical structure and/or of damage or states in the mechanical structure which result from the loads in the mechanical structure. Rotations of a part of the mechanical structure caused by loads/damage in the mechanical structure are measured by a fiber optic rotation sensor that is rigidly connected mechanically to the structural part. The loads/damage/states in the mechanical structure are deduced from the measured rotations.

10 Claims, 2 Drawing Sheets

(56) References Cited

U.S. PATENT DOCUMENTS

| | | | |
|---|---|---|---|
| 5,235,404 A * | 8/1993 | Fejer et al. | 356/460 |
| 6,195,615 B1 | 2/2001 | Lysen | |
| 6,435,044 B1 * | 8/2002 | Adolph | 73/865.9 |
| 6,530,284 B1 * | 3/2003 | Ikeda et al. | 73/784 |
| 2003/0019294 A1 | 1/2003 | Richter | |
| 2004/0089474 A1 * | 5/2004 | Noureldin et al. | 175/45 |
| 2004/0107671 A1 | 6/2004 | McGinnis | |
| 2008/0061959 A1 * | 3/2008 | Breed | 340/539.1 |

FOREIGN PATENT DOCUMENTS

| | | | | |
|---|---|---|---|---|
| EP | 0 457 200 | | 11/1991 | |
| WO | WO 00/43768 | * | 7/2000 | G01N 29/14 |
| WO | WO 03/019113 | | 3/2003 | |
| WO | WO 2005/073688 | | 8/2005 | |

\* cited by examiner

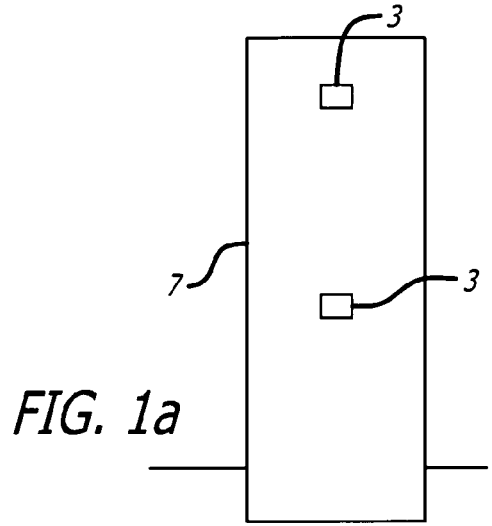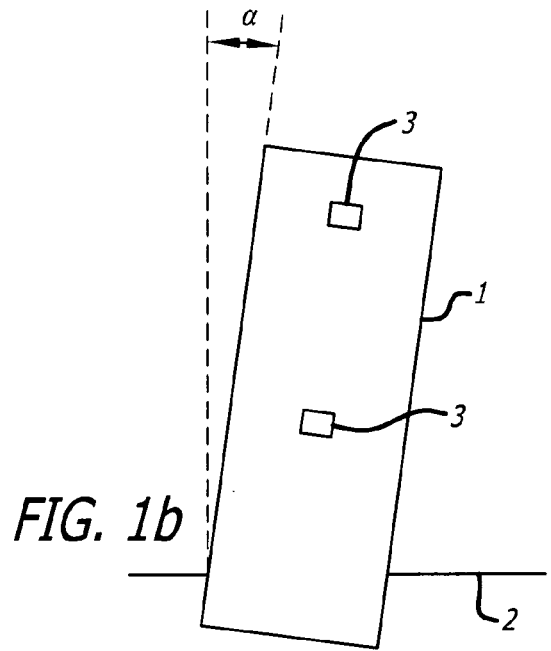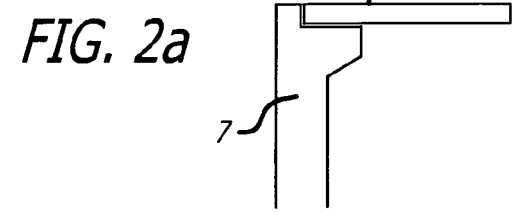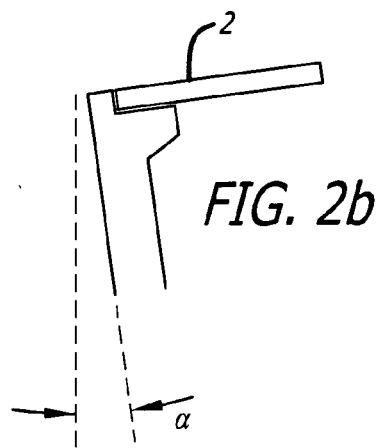

METHOD FOR DETERMINING LOADS ON A MECHANICAL STRUCTURE AND THE RESULTANT DAMAGE

BACKGROUND

1. Field of the Invention

The present invention relates to a method for determination of loads in a mechanical structure and/the damage or states of the mechanical structure that result from the loads. The invention pertains, in particular, to a method for determining building loads and resulting damage and to a device suitable for this purpose.

2. Description of the Prior Art

The monitoring of structural integrity of buildings during and after the occurrence of building loads (e.g. due to earthquakes, storms, snow accumulation on a flat roof) is an important task. In addition to the need to reduce personal damage, the minimizing of building utilization downtimes must also be considered. Moreover, towns that are constantly growing in size, and have highly varying terrains, lead to situations where the effects of building loads (due, for example, to earthquakes) may vary considerably from one part of town to another. The types and structures of individual buildings within a very narrowly delimited region can also vary quite sharply. Consequently, in an extreme situation, it is possible for one building, when subjected to building loads, to be seriously damaged, while a directly adjacent structure remains virtually intact.

In terms of disaster protection, an extremely difficult situation can arise with regard to the optimization and coordination of rescue measures as there are no simple criteria for prioritizing aid in the event of a disaster in a relatively large municipal area.

SUMMARY AND OBJECTS OF THE INVENTION

It is therefore an object of the invention to provide a method and device for determination of individual building loads and/or building damage, to facilitate prioritization of aid measures in the event of a disaster in a relatively large municipal area.

The present invention addresses the preceding object by providing, in a first aspect, a method for the determination of building loads and/or damage resulting from building loads. Such method is begun by measuring the rotations of at least one building part with respect to the rotation of the earth caused by building loads/building damage by means of at least one corresponding fiber optic rotation sensor rigidly mechanically connected to a building part. The building loads/building damage are then deduced from the measured rotations.

In a second aspect, the invention provides a method for determination of loads in a mechanical structure and/or of damage or states in the mechanical structure which result from the loads in the mechanical structure. The method is begun by measuring the rotations of at least one part of the mechanical structure caused by loads/damage in the mechanical structure with respect to the axis of rotation of the earth by means of at least one corresponding fiber optic sensor that is rigidly mechanically connected to a structural part. The loads/damage in the mechanical structure are then deduced from the measured rotations.

In a third aspect, the invention provides a device for determining building loads and/or damage resulting from building loads. Such device includes a fiber optic rotation sensor rigidly mechanically connected to a building part. An evaluation apparatus is provided. Such apparatus is connected to the rotation sensor. The sensor determines the building loads/building damage on the basis of rotations of the building part with respect to the axis of rotation of the earth detected by the rotation sensor.

In a fourth aspect, the invention provides a device for determining loads in a mechanical structure and/or damage or states in the mechanical structure that result from the loads. Such device includes a fiber optic rotation sensor that is rigidly mechanically connected to a part of the structure. An evaluation apparatus is provided. Such apparatus, connected to the rotation sensor, determines the loads/damage in the structure based on rotations of the structural part with respect to the axis of rotation of the earth that have been detected by the rotation sensor.

In a final aspect, the invention provides a device for determining loads in a mechanical structure and/or damage or states in the mechanical structure resulting from such loads. Two or more rotation sensors are provided, each rigidly mechanically connected to a different part of the structure. An individual evaluation apparatus is connected to each of the rotation sensors of an autonomous radio network for jointly determining the loads/damage in the structure. Such determinations are based upon rotations or torsions of the structural part with respect to the axis of rotation of the earth detected by the two or more rotation sensors and jointly analyzed.

The preceding and other features of the invention will become further apparent from the detailed description that follows. Such description is accompanied by a set of drawing figures. Numerals of the drawing figures correspond to those of the written description with like numerals referring to like features throughout.

BRIEF DESCRIPTION OF THE DRAWINGS

FIG. 1 is a diagrammatic illustration of a building part with rotation sensors mounted on it before and after an earthquake;

FIG. 2 is a diagrammatic illustration of two contiguous building parts before and after an earthquake;

DETAILED DESCRIPTION OF THE PREFERRED EMBODIMENT

Figure 3:
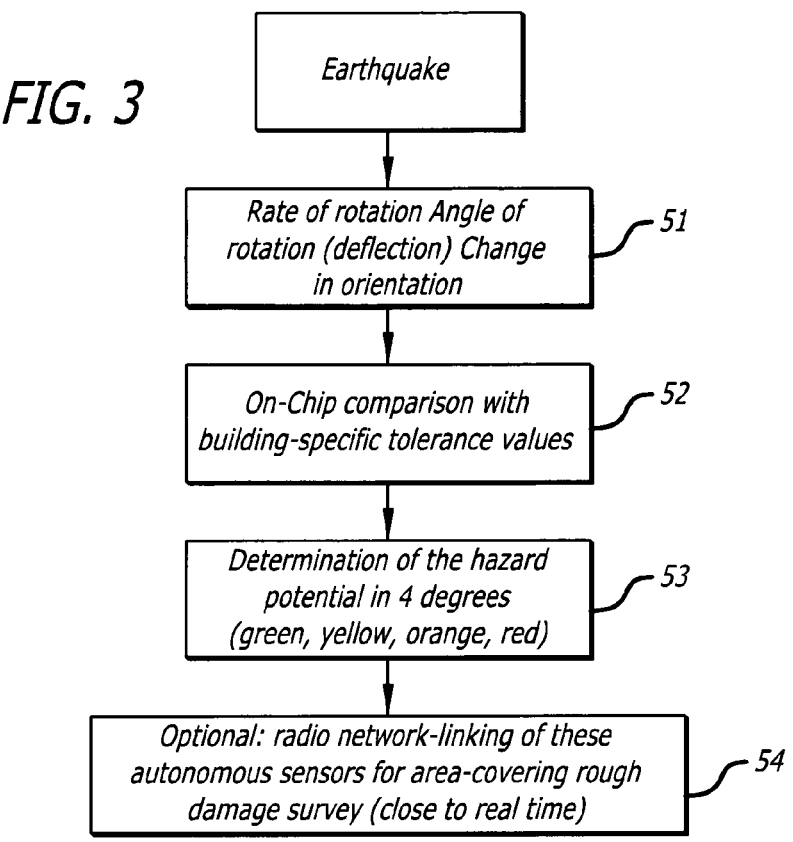
FIG. 3 is a flowchart of an embodiment of the method of the invention.

For the purposes of the detailed discussion that follows, components or component groups corresponding to one another are identified in the drawing figures by identical reference numerals. It is assumed, for the sake of simplicity, that the building loads/building damage referred to below are caused by earthquake damage.

"Mechanical structure" is to be understood to mean a building or part of a building (e.g. roof), a bridge, a tunnel, the fuselage or wings of an aircraft, part of the ground (e.g., the rock of a mountain), a conduit or traffic route (road, rail tracks, railway lines), or the like.

An essential element of the invention is (preferably) a three-component inertial fiber optic rotation sensor firmly connected to a structure. In this way, the sensor participates in the movements of the building (or building sections) and delivers the rate of rotation about three linearly independent spatial directions (e.g., about the "longitudinal axis", and the "transverse axis" of the building and about the horizontal plane of the latter) as a sensor signal. The rates of rotation are integrated in a processor part of the sensor, and the cumulative maximum deflection with respect to an inertial reference system is calculated. The maximum deflection angle between a supporting wall and the concrete ceiling of a building is a critical variable for assessing the remaining load-bearing capacity of the building part. An excessive deflection of a ceiling panel in relation to its support leads to an overstressing of the supporting structure and to crack formation detrimental to load-bearing capacity. In this context, it is unimportant whether deflection takes place abruptly or is distributed over a relatively long period of time. What is decisive for structure durability is maximum deflection angle.

FIG. 2 is a diagrammatic illustration of two contiguous building parts before and after an earthquake. FIG. 2(a) shows a concrete ceiling 2 suspended normally on a sidewall 1, without loads due to building inclinations, while FIG. 2(b) shows the situation after an earthquake. If the angle of inclination ( ) that has occurred due to the earthquake overshoots a particular threshold value, the building may collapse. When compared with the use of conventional accelerometers, the method of the invention possesses the advantage that it is based on absolute rotation measurement and covers a very broad dynamic range. Thus, not only are high-frequency deflections detected, but also inclination variations that take place very slowly in frequency ranges that are not accessible by inertia sensors. Depending on the arrangement of a plurality of sensors in a building, therefore, not only is the inclination of a structure (assumed to be rigid) obtained, but also the differential inclination or torsion between individual storeys and building parts equipped with such sensors.

Accelerometers that function according to the concept of mass inertia may additionally be employed. It thus becomes possible, for the first time, to acquire a complete sensor for all six degrees of freedom of movement (i.e., three degrees of freedom of translation and three degrees of freedom of rotation).

FIG. 1 is a diagrammatic illustration of a building part with rotation sensors mounted on it before and after an earthquake. The building sensor 3 according to the invention (which may contain translation sensors in addition to a fiber optic rotation sensor) detects rates of rotation or the integral deflection angle of a building or building part under the action of an earthquake. For such purpose, it is mounted rigidly on fixed side-walls 1 that represent the building behaviour. FIG. 1 (a) shows the situation before an earthquake while FIG. 1 (b) shows the situation after an earthquake, for one spatial direction. The assumed inclination of the building is in the paper plane with the sensitive axis of rotation of the building sensor 3 projecting out of the paper plane.

In principle, damage to the building may also take place in the other horizontal spatial direction, as well as in a rotation about the vertical axis (torsional vibrations). A complete sensor triad covers all the directions of movement. Depending on the structure of the building, however, there may also be directions which are less at risk due, for example, to higher rigidity, so that individual sensor components may be dispensed with under certain circumstances.

Since rotation sensors detect rotations absolutely on the basis of the Sagnac effect, the orientation of a building in relation to the axis of rotation of the earth can be evaluated automatically before, during or after an earthquake in real time as a measurement criterion. This makes it possible to determine the change in orientation of a building without having to rely on local references that could, of course, have changed due to the earthquake.

FIG. 3 is a flowchart of an embodiment of the invention. The sensor 3 measures, in continuous sequence, the rate of rotation and the angle of rotation (corresponding to deflection of the building or building part). It also determines the scalar product between the earth rotation vector and the sensor normal (sensitive axis) at step S1. Under the action of an earthquake or a high wind load (storm gust), the observation variables yield larger values that are compared by control electronics with a tolerance-value table embedded in the program (step S2). This table is specifically coordinated with each building. From comparison between the individual building tolerances and the instantaneous measurement values, the processor determines the hazard potential resulting from the external event (step S3). In the simplest instance, this is signaled by a four-step color code (i.e., green, yellow, orange and red).

Through dynamic radio network-linking of any of these sensors (e.g., in entire town parts) an area-covering rough damage survey can be established in close to real time (smart sensor application). This can be retrieved and utilized, for example, by disaster protection services, for preparation of priority lists (step S4).

Although fiber optic gyroscopes do not yet have the sensitivity of large ring lasers, they are suitable both for field use in the region near a seismic event (aftershock zones, volcanoes, etc.) due to their small dimensions and low power consumption, and for the instantaneous detection of building states after earthquake actions, as well as the monitoring of static deformations. Combining rotation sensors and seismometers or accelerometers offers the possibility of developing and utilizing a complete sensor for all six degrees of freedom of movement. An important aspect in this context is to take into account the particular conditions of rotation sensors for measurement free of local reference symbols (e.g., the possibility of absolute orientation of the sensor in real time, and also the self-calibration of the sensor by means of the global earth rotation signal).

According to the invention, novel mobile and cost-effective sensors are provided, which, together with classic seismic sensors, make it possible to observe ground movements correctly (i.e., in all six degrees of freedom of movement). A complete description of ground movements, not only translations but also rotations, must be observed with high resolution.

According to the invention, long-term extensive statements on variation and deformations can be made by means of broadened six-component recordings (novel measurement methods which can be used in a mobile, cost-effective and rapid way). The additional observation variable "rotational movements" can also be used, above all, in the inversion of seat parameters (dynamic rotation), and its accuracy can be improved. In this case, in particular, the otherwise inseparable coupling of inclination and translations of the measured signals on the sensor plane can be investigated and corrected by the provision of correspondingly high-resolution rotation measurements. Since the transverse acceleration and rate of rotation during an earthquake are in phase with and proportional to one another, it is not possible to prevent the seismograph from including a coupling of earthquake-induced inclination fractions into the sensor signal of the other linearly independent spatial directions in a zone near the earthquake event. Only a sensor with all six independent degrees of freedom of movement (i.e., including rotation) can offer an improvement.

The concept of the invention can cost-effectively increase the sensitivity of existing rotation sensors in the design of fiber optic gyroscopes based on glass fibers by up to two orders of magnitude, as compared with the prior art. When supplemented by a broadband seismometer, one can, for the first time, make all six degrees of freedom of movement available with sufficient sensitivity in a portable implementation capable of being used in the field.

The invention concentrates on the utilization and further development of modern rotation sensors as a novel and innovative basic technology for use in early-warning systems. The diverse novel technological possibilities arising from this are to be applied, in particular, to the monitoring of building structures and to the field of seismology.

After an earthquake, particularly in larger metropolitan areas, rapid estimation of damage to important buildings is of central importance, particularly to optimize rescue measures. If the co-seismic movements (time profile of the deformations, static displacements and static rotations) could be measured and evaluated in terms of critical variables, close to real time, in an independent sensor, then deformation-induced variations, particularly for critical buildings and conduits or traffic routes could be determined virtually instantaneously. According to the invention, a cost-effective intelligent 6-C sensor is provided that can be installed as a "black box" in buildings, bridges, tunnels or other structures. It records useful data relating to building behavior during an earthquake or another deforming event and provides this data for analysis. According to the invention, particular attention is also placed on utilizing the properties of the rotation sensors as absolute protractors. The devices according to the invention are distinguished by low power consumption and are suitable for cost-effective mass production. The installed electronics, by instantaneous integration and differentiation of the sensor signals within the sensor, can thus be expected to deliver a hazard or damage estimation, close to real time, for the building. The combination of such sensor units of independent design into autonomous local or regional networks is additionally possible. The aim, in terms of structural mechanics, is to determine dynamic excitation as a result of earthquakes or other subsoil movements, such as vibrations, in terms of both amplitudes and relevant wavelengths, by utilizing suitable sensors. By coupling geophones or acceleration sensors with rotation sensors as absolute protractors, both characteristic variables of dynamic excitation can be detected by a small number of measurement points. For linear structures, curvatures caused by the action can be described from measured rotations. According to the invention, building on the preceding, evaluation of excitation can be carried out by a comparison of the measurement results with the assumptions on which the dynamic design of the structure is based. In addition to the detection of dynamic excitation, the remaining static deformation caused by the action is of interest. For example, by lining up a plurality of sensors, the remaining deformation line can be determined through measured rotations. The possibility of measuring the (quasi)static and dynamic information by means of cost-effective sensors constitutes a considerable advantage when compared with other measurement methods. The self-calibration of the sensor and its effect, independent of position, with regard to weight open up a broad field of applications also in terms of early warning against the consequences of antropogenic actions or critical action/resistance combinations (e.g., high snow loads on weakened structures, actions due to extreme wind loads, etc.), allowing the use of the sensors for tasks that can be carried out only in a very complicated way and not in real time with other measurement methods. An important area of early-warning systems that goes beyond seismic excitation and is covered by the invention is the monitoring of subsoil movements, such as those that occur in tunnel building, during earth excavation, due to foundation loads or in hill subsidence zones. Consequently, with the aid of sensors, monitoring covers dynamic actions (i.e., the causes of deformations or damage) together with the remaining deformations.

Deformation Observations in Earthquakes and on Volcanoes

The problems in determining static (and dynamic) deformation from seismometer observations have been known for decades without a satisfactory stable solution. The main reason for such problems is the additional effects that occur in seismographs due to rotations and changes in inclination. This leads to situations where speed or acceleration seismographs cannot be integrated. GPS instruments are only a partial improvement since (1) vertical resolution is low and (2) the sensing rate is not sufficiently fine for dynamic observations. With cost-effective 6-C seismometers capable of mobile use, an area-covering observation of dynamic and static deformations would be possible. This could, in the long term, also allow improvements in the real-time determination of seat parameters. Similar arguments apply to seismic observations of volcanoes in which sometimes pronounced deformations are to be expected. The unavoidable coupling of rotational and tilting movements influences the standard broadband measurements by seismometers and makes modeling more difficult. The combined data analysis of rotations and translations makes it possible, in this area, to have an improved mapping of seat processes and of the state of magma chambers.

In one embodiment of the invention, both the dynamic ground/building interaction and the structural dynamics of the building structure are taken into account in determining the loads/damage.

The aim of the invention is to reduce earthquake-induced hazards and risks. The observations of the entire movement components have been urged for decades by theoretical seismologists. The most recent developments in sensor technology now seem to allow the design of a suitable measuring instrument with the required accuracy. In this context, it should be noted that measurement technology has a broad potential for use in both the purely scientific and the engineering sectors.

The ever-continuing rapid growth of large metropolitan areas in earthquake-endangered regions (e.g., Istanbul, Tokyo, Los Angeles and New Mexico) leads, in the case of a strong earthquake, to tremendous damage and loss of many human lives. Due to the completely heterogeneous building structures and variable subsoil properties in such mega-metropolises, it is not possible for responsible disaster management to obtain a survey of the damage situation in a short time. The rapid initiation of coordinated rescue action is consequently seriously impeded, and the expected result is not optimum. Autonomous monitoring systems, which co-log a damage event and evaluate, close to real time, according to predefined methods and make the result quickly available, could lead to a decisive improvement. By dynamic weighting according to the function of the building and the automatic damage assessment carried out by the sensor, as well as other criteria to be determined (e.g., optimization of travel distance for rescue forces), effective utilization of the critical first 6 hours after a damage event may be envisioned.

The building sensor concept according to the invention is innovative in two respects. On the one hand, it is intended to show the way to a monitoring system in which the building behavior is logged in detail during the action of external forces (earthquake, extreme wind load, ground subsidences, etc.) In such case, complete independence of local reference systems is achieved through the property of the rotation sensors used as absolute protractors. In this regard, the sensor corresponds to a "black box", such as employed in aircraft. In addition to these logging functions, key parameters (e.g., maximum deflection) are investigated, during measurement, for overshooting of building-specific predefined limit values, and, if possible, may allow a classification of the damage caused (e.g., the degree of risk of collapse) and transfer this to a central location (local disaster protection cell) (use of mains power-independent radio technology). This would consequently perform an important step toward quasi-real-time damage prognosis.

The sensors developed for field use in regions of strong ground movement have several shortcomings in seismology. Inclinations of the seismometer induce both a sensor signal and the translations actually to be measured. In near-earthquake zones, the complete movement vector cannot be reconstructed due to the absent degrees of freedom of rotation. Consequently, the measurements are both incomplete and, because of the intermixing of signal sources, faulty. This constitutes a serious impediment to the inversion of earthquake parameters. It is to be expected that complete detection of all six degrees of freedom of movement and the clear separation of translation and rotation (inclination), along with sufficient sensor sensitivity, can make a marked contribution to improving the seismological models (independence from apparatus transfer functions).

Ring lasers are highly sensitive active optical interferometers and, hitherto, the only instruments which can quantitatively determine the rotation signals from teleseismic events. Even for use in seismology, where long-term stability is not a major factor, they still require a very high temperature stability of better than 0.1 degrees per day. Thermally induced expansion or contraction of the optical resonator within the range of a few hundredths of a micrometer cause a drift in the optical operating frequency that then leads to sudden jumps in the longitudinal mode index (mode jump). Furthermore, despite all the simplifications it has been possible to implement successfully (the GEOsensor project), ring lasers remain a complex installation. This makes them unsuitable for three specific applications: (1) a short-term transfer of the sensor into the vicinity of the epicenter after a strong earthquake to record aftershocks in the near field; (2) the detection of the complete movement (all six degrees of freedom) under the influence of strong ground movements; and (3) as part of a monitoring building sensor system, they are too costly and much too sensitive. On the other hand, fiber optic rotation sensors, although lacking the sensitivity of ring lasers, are nevertheless robust and compact with a markedly higher temperature tolerance. Furthermore, they are significantly more cost-effective.

The method of the invention can utilize the self-calibrability of the system. Since rotational sensors measure rotations absolutely on the basis of the Sagnac effect, the earth rotation signal is always superposed on the sensor signal. This signal may be considered, within the framework of the proposed application, as a constant reference. It is available at any point in time (i.e., before, during and after an earthquake) as a reference independent of the local surroundings. It can be used to determine the instantaneous orientation of the sensor in relation to the axis or rotation of the earth. A comparison before and after an earthquake delivers a change in orientation of the sensor due to the seismic event of building deformation. Since the sensor is mounted firmly on a wall for measurement, this change in orientation corresponds to either a building inclination, a deformation, or a displacement between individual storeys. This signal is determined by the integration of the measured rate rotation, and, even after a short integration time of approximately one minute, a resolution of less than 1 degree is achieved. The resolution of the gyroscope depends on the projection of the normal vector on the sensor's fiber coil on the rotation axis of the earth. A large value for this projection is desirable for a high sensor resolution. Investigation of the optimal sensor implementation (reference system of the sensor) is therefore a specific operating point. After the investigation with regard to the utilization of the orientation signal, the utilization of the rotation signal of the buildings is a major factor. For this purpose; (1) criteria are to be set up between measured angular deflection and stress of the building or various materials; and (2) the effect of the displacement of individual storeys in relation to one another is to be quantified (interstorey rotation) and transmitted to the sensor system.

The output signal of a FOG (Fiber Optical Gyro) is the phase difference between light waves propagating around a surface in opposite directions. It is proportional to the rotational speed of the sensor and to the surface circumscribed by the light beams. The main advantage of a FOG, as compared with a ring laser, is that the optical signal can be guided in a glass fiber. In a FOG, the effective surface can be increased, without the dimensions of the sensor having to be varied appreciably. On the other hand, fiber optic gyroscopes differ from ring lasers in that they carry out phase measurement, whereas ring lasers determine a frequency difference by interferometry and thus achieve a higher resolution by virtue of the concept adopted. This is a great disadvantage in the implementation of a FOG. The signal-to-noise coefficient (resolution) of a FOG depends not only on the scale factor, but also on the optical power density. For example, for a light source with a wavelength of 1.55 µm, a luminous power of PO=100 µW, a length of the glass fiber of 1000 m and a diameter D of the coil of 0.4 m, a theoretical value for the sensitivity of a FOG of 4.125☐10-8 rad/s is obtained.

The coil consisting of polarizing optical fiber constitutes an essential component of the optical path. The fiber length and the geometric diameter of the coil are linearly incorporated into the scale factor of the gyroscope. In principle, therefore, lengthening the coil fiber used makes it possible to achieve ever higher accuracies in measurement of the rate of rotation. At the same time, however, attenuation losses of the light intensity during passage through the fiber and phase change occurring due to disturbing effects, such as, for example, the Shupe effect or the Kerr effect, limit the implementable length of the fiber coil. Coils with a length of approximately 1000 m and a diameter of up to 300 mm are therefore planned.

Figure 4:
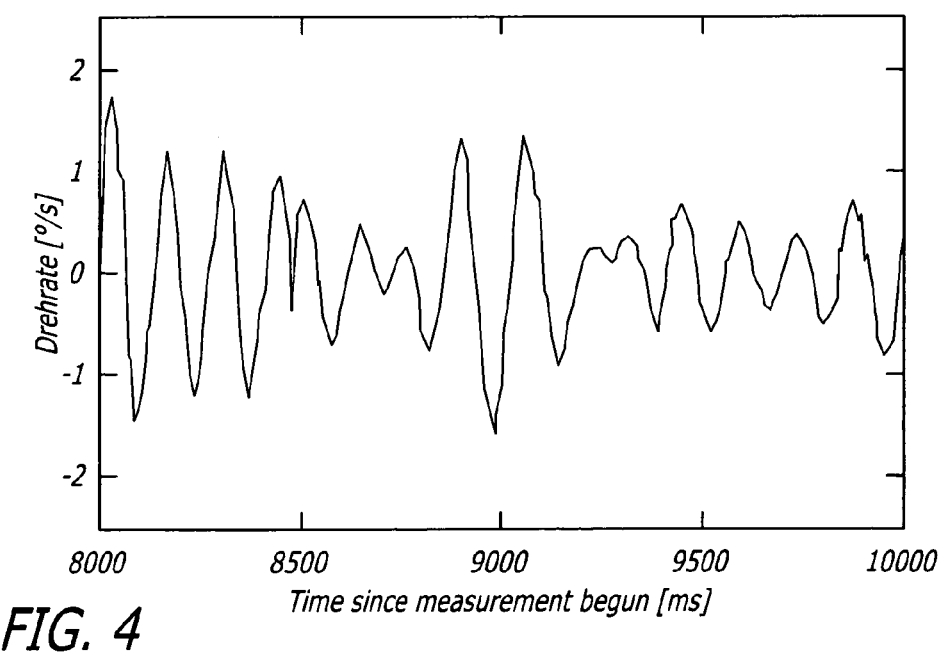
FIG. 4 is a graph of a torsion profile of a building during an earthquake.

FIG. 4 is a graph of a torsion profile of a building during an earthquake. The Figure shows a short extract from a measurement of torsion (left-hand side), in which a building model (right-hand side) with eccentric mass distribution has been exposed on a vibrating table to an artificial earthquake.

It may be mentioned, in this regard, that earthquake-induced rotation observations of teleseismic events are compatible with collated broadband translation measurements, and that additional information is contained in the amplitude ratio.

The method of the invention for the determination of building loads and/or building damage resulting from building loads is distinguished in that the rotations of a building part caused by building loads or building damage are measured with a fiber optic rotation sensor that is rigidly mechanically connected to the building part and the building loads/building damage are deduced from the measured rotations.

A multiplicity of rotation sensors may be employed rather than a single fiber optic rotation sensor to make the determination of the building loads/building damage more precise. Rotations of a plurality of building parts caused by building loads/building damage may then be measured by corresponding fiber optic rotation sensors rigidly mechanically connected to the building parts, and the building loads/building damage deduced from the measured rotations. Each rotation sensor thus measures the rotations of that building part to which it is connected. The overall state of the building can then be deduced from the sum of the determined rotations of the individual building parts. Alternatively, the building loads/building damage can be ascertained individually for each part of the building. It is therefore possible, for example, to detect torsions within a building, (e.g., between two successive storeys).

Each rotation sensor may be designed individually as a uniaxial, biaxial or triaxial rotation sensor, i.e. each rotation sensor may be designed individually as a sensor that measures rotations about one, two or three axes of rotation. Particularly critical building parts may be equipped with triaxial rotation sensors to allow precise measurement, whereas biaxial or uniaxial rotation sensors may be sufficient in the case of uncritical building parts.

In one embodiment, the rotation sensors are fastened to sidewalls of a building, so that the relative angles between the sidewalls and the floors (or ceilings of the building supported by the sidewalls) can be deduced from the measured rotations. Such relative angles are a proven measure for assessment of building loads/building damage, resulting in particular from earthquakes.

In addition to the fiber optic rotation sensors, acceleration or other sensors may be provided. Such sensors, which are mechanically rigidly connected to corresponding building parts and measure translations of the building parts caused by building loads/building damage. The building loads/building damage is then deduced from the measured translations. The provision of such additional sensors allows a particularly precise determination of building loads/building damage as all six degrees of freedom of movement (i.e., three degrees of freedom of translation and three degrees of freedom of rotation) can thereby be measured.

In one embodiment of this invention, the change in orientation of the building with respect to the axis of rotation of the earth is deduced from the measured rotations and/or translations. Such change in orientation provides a reliable measure of the building loads/building damage to be determined, particularly in the case of earthquake damage.

The invention provides a method for the determination of loads in a mechanical structure and/or of damage or states in the mechanical structure which result from the loads in the mechanical structure. The method is characterized in that the rotations of a part of the mechanical structure which are caused by loads/damage in the mechanical structure are measured by a fiber optic rotation sensor rigidly mechanically connected to the structural part. The loads/damage/states in the mechanical structure are deduced from the measured rotations.

The invention also relates to a method for determination of loads in a mechanical structure and/or of damage or states in the mechanical structure that result from loads in the mechanical structure. It is characterized in that the rotations of a plurality of parts of the mechanical structure caused by loads/damage in the mechanical structure are measured with corresponding fiber optic rotation sensors that are rigidly mechanically connected to the structural parts. The loads/damage/states in the mechanical structure are deduced from the measured rotations.

The invention additionally provides a device for the determination of building loads and/or of building damage resulting from building loads. It includes a fiber optic rotation sensor rigidly mechanically connected to a building part. An evaluation apparatus is connected to the rotation sensor for determining the building loads/building damage on the basis of rotations of the building part detected by the rotation sensor.

The invention further relates to a device for the determination of loads in a mechanical structure and/or of damage or states in the mechanical structure which result from the loads in the mechanical structure. The device has a fiber optic rotation sensor rigidly mechanically connected to a part of the structure. An evaluation apparatus is connected to the rotation sensor for determining the loads/damage/states in the structure on the basis of rotations of the structural part detected by the rotation sensor.

The evaluation apparatus of the individual rotation sensors may be network-linkable to other instrumental units. This way rotation data can be collected in a simple way, so that a rough damage survey can be set up shortly after building loads/building damage. In such case, it is possible to both provide each rotation sensor with a specific evaluation apparatus and a single central evaluation apparatus connected to all the rotation and other sensors. The network-linking of the evaluation apparatus to other instrumental units or the network-linking of the rotation sensors to a central evaluation apparatus may take place, for example, over cable lines or radio connections.

According to the invention, a sensor based on absolute rotation measurement is utilized that detects deflection of the building during an earthquake dynamically in three spatial directions by means of a specialized fiber optic gyroscope. In this case, maximum and cumulative deflection of individual storeys, or of the entire building, are determined in real time and can be compared with a predefined building-specific tolerance table previously embedded in the sensor or in an evaluation apparatus connected to the sensor. To assist immediate measures, building evaluation is indicated, for example, in a simple multi-step colour code and made available at the same time from an external interface. This makes it possible to connect a plurality of such sensors to an overriding functional unit and to incorporate individual sensors or sensor complexes in a radio network.

While the invention has been described with reference to its presently-preferred embodiment, it is not limited thereto. Rather, it is only limited insofar as it is defined by the following set of patent claims and includes within its scope all equivalents thereof.

What is claimed is:

1. A method for the determination of damage or states of a mechanical structure which result from a loading of the mechanical structure, comprising:
determining in each case a sensor signal of a fiber-optic rotation sensor connected mechanically rigidly at least to part of the mechanical structure before and after the loading;
determining in each case an earth's rotation signal superposed on the sensor signal from the respective sensor signal;
determining on the basis of the superposed earth's rotation signals determined in each case, and without removing the effect of the earth's rotation, a respective instantaneous orientation of the fiber-optic rotation sensor with respect to the earth's rotation axis;
determining a change in orientation of the rotation sensor from the respective instantaneous orientations of the fiber-optic rotation sensor before and after loading, and
determining the damage or states of the mechanical structure on the basis of the change in orientation of the rotation sensor.

2. The method as claimed in claim 1, further comprising:
determining in each case a further sensor signal of a further fiber-optic rotation sensor connected mechanically rigidly at least to a further part of the mechanical structure before and after the loading;
determining in each case a further earth's rotation signal superposed on the sensor signal from the respective further sensor signal;
determining on the basis of the further superposed earth's rotation signals determined in each case, a respective further instantaneous orientation of the further fiber-optic rotation sensor with respect to the earth's rotation axis,
determining a further change in orientation of the further rotation sensor from the respective further instantaneous orientations of the further fiber-optic rotation sensor before and after the loading, and
determining the damage or states of the mechanical structure on the basis of the changes in orientation of the rotation sensor and of the further rotation sensor.

3. The method as claimed in claim 1, characterized in that the respective rotation sensors measure rotations about 1, 2 or 3 rotation axes.

4. The method as claimed in claim 1, further including the step of applying said method to a mechanical structure in the form of a building of the type that comprises at least one floor, at least one sidewall and at least one ceiling.

5. The method as claimed in claim 4, further comprising fastening the rotation sensors to sidewalls of the building in such a way that the relative angles between the sidewalls and the floors and ceilings of the building which are supported by the sidewalls can be inferred from the measured rotations.

6. The method as claimed in claim 4, further comprising:
measuring the translations of at least one building part which are caused by the building loads/building damage via corresponding acceleration sensors which are connected mechanically rigidly to the at least one building part and
inferring the building loads/building damage from the measured translations.

7. The method as claimed in claim 6, further comprising inferring the change in orientation of the building with respect to the earth's rotation axis, which change in orientation is a measure of earthquake damage to be determined, from the measured rotations and translations.

8. A device for the determination of damage or states of a mechanical structure which result from a loading of the mechanical structure, characterized by:
at least one fiber-optic rotation sensor which is connected mechanically rigidly at least to part of the mechanical structure; and
said rotation sensor including a processor that determines respective instantaneous orientation sensor signals of the fiber-optic rotation sensor before and after the loading; that determines an earth's rotation signal superposed on the respective sensor signals; that determines respective instantaneous orientations of the fiber-optic rotation sensor with respect to the earth's rotation axis on the basis of the superposed earth's rotation signals determined in each case before and after the loading, and that determines the damage or states of the mechanical structure on the basis of the change in orientation of the rotation sensor without removal of the effect of the earth's rotation.

9. The device as claimed in claim 8, characterized by a plurality of fiber-optic rotation sensors, each of which is connected mechanically rigidly to a distinct part of the mechanical structure and, furthermore, is connected to a central processor for determining loads/damage on the basis of rotations with respect to the rotation of the earth.

10. The device as claimed in claim 9, characterized by in each case a processor, included with a respective rotation sensor, of an independent wireless data transmission system for the joint determination of the damage or status of the structure on the basis of rotations or torsions with respect to the earth's rotation axis which are detected by the individual rotation sensors and are jointly analyzed by a central processor.

* * * * *